(No Model.)
C. WALDEMANN.
PROCESS OF AND APPARATUS FOR SMOKING FISH.
No. 577,672. Patented Feb. 23, 1897.
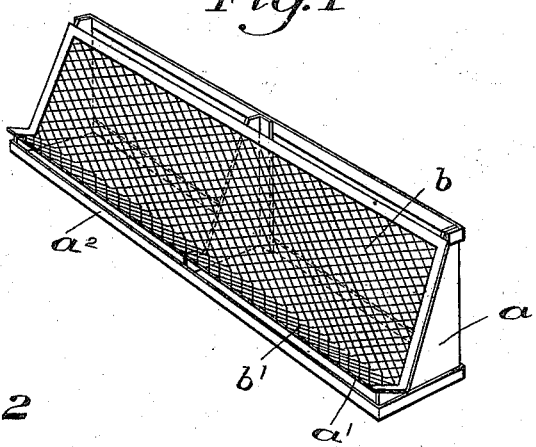
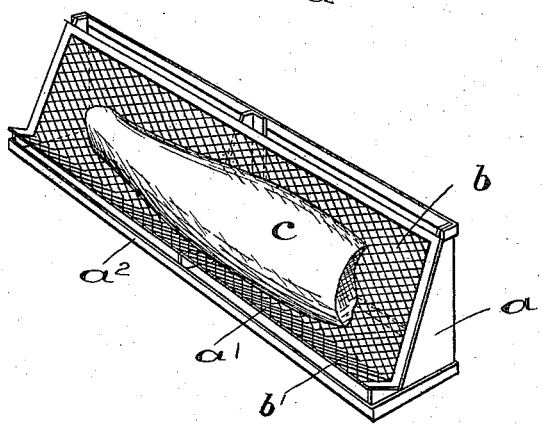
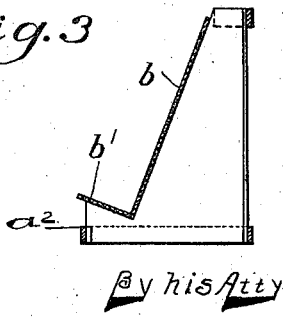
Witnesses:—
B. Krueger
R. Lucke
Inventor:—
Carl Waldemann
By his Atty

UNITED STATES PATENT OFFICE.

CARL WALDEMANN, OF CÖSLIN, GERMANY.

PROCESS OF AND APPARATUS FOR SMOKING FISH.

SPECIFICATION forming part of Letters Patent No. 577,672, dated February 23, 1897.

Application filed July 3, 1896. Serial No. 598,028. (No model.)

*To all whom it may concern:*

Be it known that I, CARL WALDEMANN, a citizen of the Kingdom of Prussia, and a resident of Cöslin, in the Kingdom of Prussia and German Empire, have invented certain new and useful Improvements in Processes of and Apparatus for Smoking Fish, of which the following is a specification.

My invention relates to an improved process of and apparatus for smoking salmon and similar fish.

Heretofore the fish, particularly large fish, as salmon, have been divided longitudinally, bored at one end, and suspended in two parts in the smoking-chamber. If the flesh of the fish is tender, soft, or flaky, it often happens that the soft inner side cracks, which injures considerably the appearance of the smoked fish. Besides the flaws and cracks are also apt in the summer to mildew after a few days, and the mildew can be, if at all, only removed with great difficulty. A further inconvenience of the old process is that, especially for heavy fishes, the suspension-holes tear out and the whole falls into the fire beneath and is lost. The process is also very slow, since the water running from the fish traverses its whole length and keeps it damp a long time.

The object of my invention is to avoid these inconveniences and to provide a process and devices connected therewith which will quickly cure the fish and dry it in a uniform manner and by novel means which will prevent its breaking, cracking, and falling apart and which will retain the natural juices and flavor of the fish in a simple, expeditious, and inexpensive manner, as will hereinafter appear, with reference to the accompanying drawings, wherein—

Figure 1 is a perspective view of a wire-screen frame, partly shown by dotted lines and adapted to hold the fish while it is being smoked; Fig. 2, a similar view of said frame with a half-section of fish placed thereon ready to be smoked, and Fig. 3 a cross-section of the said screen-frame.

The smoking-frame consists, essentially, in a stand formed of several triangular flanged metal plates $a$, having a ledge projection $a'$ at its base and connected together by longitudinal frame-strips $a^2$ and by oppositely-inclined wire screens $b$ and $b'$ upon the sloping sides of the metal plates $a$ and of their ledge projections $a'$, which provide a bed or support, open on all sides, upon which the half-fish $c$ may rest while being smoked.

The fish is first prepared and divided in the usual manner, and then upon the inner side of each half is evenly placed a piece of animal bladder, membrane, vellum, or similar appropriate material which covers it completely and which by means of its natural glutinous ingredients is connected securely with the inner side of the fish. A half-section of fish thus prepared is covered on the outside by its natural skin and on the inner side by the artificial coating and is ready to be placed in the smoke.

The frame above described, being made entirely of metal, may be placed over the fire and the fish held thereby horizontally in an inclined position, and the wood fire thereunder may pass over the fish from all parts and effect the smoking process more evenly and thoroughly than in the old process where the fish was suspended to hang vertically above the fire.

The advantages of the new process are as follows: The inner side of the fish does not tear or crack. It retains its natural even appearance and can be cleaned easily at any time when the piece is to be cut. Therefore no occasion for forming mildew is afforded. The fish is held so carefully and securely that even soft breakable fish will not fall to pieces or allowed to drop into the fire, as would be the case when suspended. The smoking process is shorter, as the water does not make a long passage over the whole length of the salmon, but only the shorter passage over its breadth.

A fish cured and smoked by this process and the means described is better adapted for transportation, as it has greater solidity, is more tenacious, and admits of a more even division into separate pieces.

I claim as my invention and desire to secure by Letters Patent—

1. The process of smoking fish, which consists in cutting the fish in longitudinal sections, placing in contact with the inner split surface a piece of membranous material, and then laying the fish upon a frame over the smoke, substantially as described.

2. A frame for holding fish while being cured and smoked substantially as herein described, while held in a horizontal position, consisting of a number of triangular transverse metal frame-standards having base ledge projections and wire-screen surfaces fitted thereon inclined in opposite directions and open at the back and bottom of said screen-surfaces for exposure to the smoke and fire, substantially as described.

In testimony that I claim the foregoing as my invention I have signed my name in presence of two subscribing witnesses.

CARL WALDEMANN.

Witnesses:
WM. HAUPT,
HENRY HASPER.